April 25, 1950        R. G. BROWNSTEIN        2,505,522

LUBRICANT FEEDER

Filed April 12, 1945        2 Sheets-Sheet 1

Inventor

R. G. Brownstein

By Wilfred E. Lawson
Attorney

April 25, 1950     R. G. BROWNSTEIN     2,505,522
LUBRICANT FEEDER

Filed April 12, 1945     2 Sheets-Sheet 2

Inventor
R. G. Brownstein
By Wilfred E. Lawson
Attorney

Patented Apr. 25, 1950

2,505,522

UNITED STATES PATENT OFFICE 2,505,522

LUBRICANT FEEDER

Raymond G. Brownstein, Ellwood City, Pa.

Application April 12, 1945, Serial No. 587,890

14 Claims. (Cl. 184—7)

This invention relates generally to the class of lubrication and pertains particularly to improvements in lubricant feeder devices.

In connection with the lubrication of a plurality of bearings or other devices such as might be found in mills or other places where numerous shafts or other rotating members are employed, various and numerous systems have been devised for continuously, intermittently supplying lubricant to the numerous bearings by the employment in association with a lubricant source and a pressure means, of automatic distributors which are connected with the bearings and to which the lubricant is supplied under pressure from opposite sides, such distributors being connected for this purpose in circuit with the lubricant supply source and the pressure means. Such lubricant distributors make use of one or more piston units in association with numerous other moving parts functioning as valves to permit and to shut off the flow of the lubricant at various stages in the actuation of the distributor.

A principal object of the present invention is to provide a lubricant distributor unit of improved design which employs only a single moving element which functions both as a piston and a valve for opening certain ports and closing other ports and for affecting the expulsion of the lubricant from the distributor to a bearing or to bearings.

Another object of the invention is to provide an improved lubricant feeder or distributor comprising a housing having a cylindrical chamber and a single piston body movable in said chamber with means forming a coupling between the piston and the enclosing wall of the housing whereby such piston is caused to have a prescribed rotary or turning movement together with reciprocal movement whereby to effect the progressive closing and opening of ports for the ejection of a prescribed quantity of lubricant through an outlet.

Another and more specific object of the invention is to provide an improved lubricant distributor or feeder comprising a housing body having a cylindrical piston chamber having a pair of supply ports opening thereinto and an outlet port leading therefrom, and a cylindrical piston within the chamber and having lubricant receiving spaces formed in opposite sides for connection each with a supply port, with camming means forming an operative coupling between the piston and the housing to effect a prescribed turning of the piston to establish a desired connection between one of said spaces and the exhaust or outlet port upon movement of the piston in one direction whereby lubricant in the chamber will be expelled, due to the linear movement of the piston, through such outlet port.

The invention will be best understood from a consideration of the following detailed description when taken in connection with the accompanying drawings forming a part of this specification, with the understanding, however, that the invention is not confined to a strict conformity with the showing of the drawings but may be changed or modified so long as such changes or modifications mark no material departure from the salient features of the invention as expressed in the appended claims.

Figure 1:
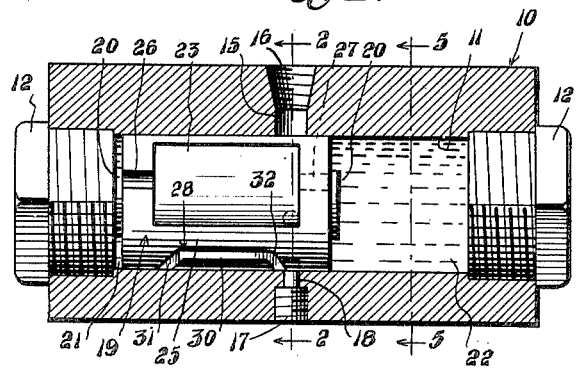
Figure 1 is a view in longitudinal section through the lubricant distributor or feeder of the present invention showing the piston in neutral position in one end of the piston chamber ready for movement for the expulsion of lubricant from the opposite end of the chamber.

Referring now more particularly to the drawings a general description of the structure of the lubricant distributor or feeder will be given first without attempting to describe the operation after which a description of the operation of the device will be set forth.

The numeral 10 generally designates the body of the feeder which is shown as being in the form of a solid or integral body preferably of square or rectangular cross section and of substantial length. Obviously such body may be formed in two or more parts if found desirable or convenient but it is preferred that it be made from a single piece of material as illustrated.

The body 10 has formed longitudinally therethrough the piston chamber or cylinder 11 each end of which is closed by a suitable plug 12 as shown.

Midway between the ends of the cylinder 11 the body has formed therethrough from opposite sides the supply ports 13 which open into the piston cylinder, the outer ends of the ports being enlarged and screw threaded as indicated at 14 for the connection of suitable supply pipes thereto.

At right angles to the ports 13 there is formed the discharge port 15 which is in the plane, transversely of the body 10, of the ports 13 and directed along a line passing centrally therebetween.

The ports 13 are, preferably, though not necessarily, in a plane upon the far side of the axial center of the cylinder 11 from the outlet or discharge port 15.

The port 15 is threaded at its outer end as indicated at 16 for the connection therewith of a suitable pipe leading to a bearing or other point requiring lubrication.

Upon the opposite side of the body 10 from the discharge port 15 there is secured in the body wall the threaded body or screw 17, upon the inner end of which is a follower stud 18 which extends into the cylinder 11 for the purpose hereinafter described.

Snugly fitted within the cylinder 11 for reciprocal movement between the plugs 12 is the piston body 19. In the center of each end of the body 19 is a button 20 which prevents the end of the piston from positioning flat against the inner end of the adjacent plug 12. Thus there is maintained at all times at each end of the piston, a grease or lubricant receiving chamber, the chamber at the left end of the cylinder being designated 21 while the one at the right end of the cylinder is designated 22.

The piston 19 has formed in opposite sides the pockets 23 and 24. These pockets 23 and 24 terminate at their ends short of the ends of the piston body as shown in Figure 1 and, as is shown in Figures 2, 4, 5 and 7, the major portions of the pockets are above the plane of the axial center of the piston body when the latter is in neutral position or, in other words, those longitudinal edges of the pockets which are nearest to the discharge port 15 are closer together or have a smaller circumferential extent of the piston body between them than the opposite longitudinal edges. Thus the wall of the piston body lying between the said opposite longitudinal edges of the pockets is of greater circumferential extent than the surface lying between the edges which are closest to the discharge port. This wall portion of greatest extent is designated 25 and may be identified for greater convenience in defining the parts of the structure as the cam wall area.

Leading from the end of the pocket 23 nearest to the chamber 21 is a feed passage 26 and a corresponding feed passage 27 leads from the opposite end of the pocket 24 into the chamber 22.

Formed in the cam wall area 25 of the piston body 19 is an endless cam channel or groove which is generally designated 28 and which comprises the spaced, parallel, longitudinally extending, straight side portions 29 and 30, each of which leads at its two ends into the divergent legs 31 and 32.

Figure 2:
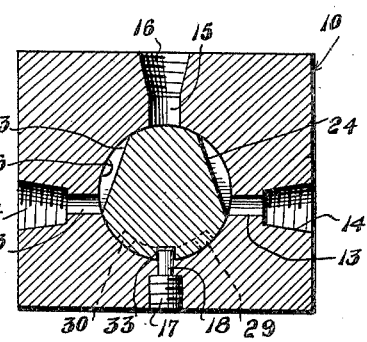
Figure 2 is a transverse section taken on the line 2—2 of Figure 1.
Figure 3:
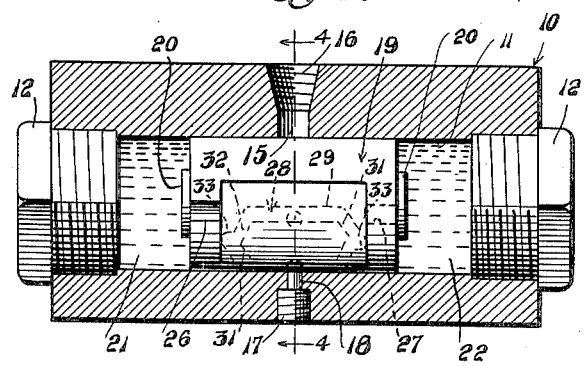
Figure 3 is a sectional view corresponding to Figure 1 but showing the piston moved to a central position in the piston chamber.

The leg 31 of each side of the cam channel is of greater length than the leg 32 and a leg 32 of each channel is in convergent relation with a leg 31 as shown, the leg 32 entering the inner side of the leg 31 of the opposite side portion of the channel so that there is formed at the outer end of each of the longer legs 31 the cam follower seat 33. The centers of these seats are on a line extending lengthwise of the piston body, midway between the sides 29 and 30 of the cam groove or channel and when the piston body is at the extreme position in the cylinder 11 toward either end of the cylinder the cam follower pin 18 will be seated in a seat 33 and the piston will be in neutral position, that is, in the position where the surface of the piston body between the convergent edges of the pockets 23 and 24 closes the outlet port 15. This position is shown in Figures 1 and 2.

Figure 8:
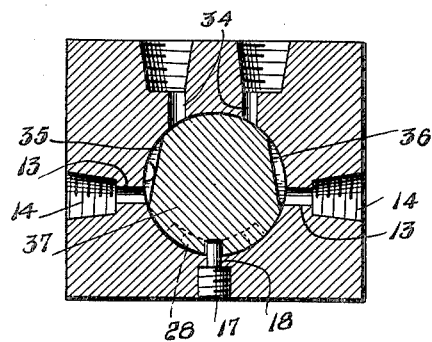
Figure 8 is a view in transverse section of a modified construction of the feeder designed for servicing two bearings or supplying lubricant alternately to each of two outlets, the piston being in neutral position.
Figure 9:
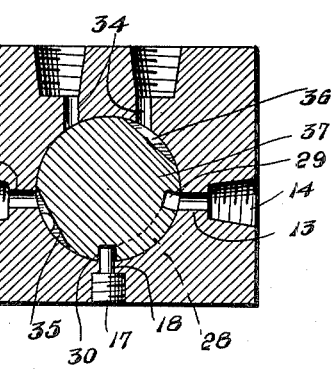
Figure 9 is a sectional view through the modified form showing the piston in position for ejection of lubricant through one outlet.
Figure 10:
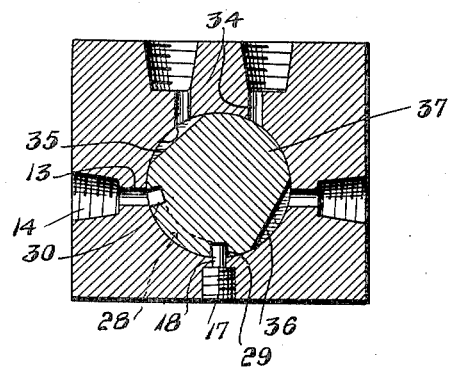
Figure 10 is a sectional view corresponding to Figure 9 but showing the pistons in position for ejection of lubricant through the other outlet.

In Figures 8 to 10 inclusive a modified form of the feeder is shown which is designed for servicing two bearings. The construction of this modified form is substantially the same as that of the first described form except that there are provided the two outlet or discharge ports 34 which are closed by the area of smaller extent between the convergent edges of the pockets 35 and 36, when the piston 37 is in neutral position. Since the other details of construction are the same as for the first described form of the invention it is not believed necessary to identify the other parts of the modification by reference characters.

In the operation of the feeder it will, of course, be understood that the feeder is connected in circuit with a suitable source of fluid, one side of such circuit being connected with one supply port 13 and the other side being connected with the opposite supply port 13. As is customary in systems of the character in which the feeder is designed for use, a suitable pressure means will be provided for moving the lubricant from the source selectively to either of the supply ports 13 by the use of a suitable reversing or four-way valve. As will be readily obvious when the lubricant is flowing into the cylinder through one port 13 the opposite port 13 provides a return flow means to the source of supply.

Figure 1 shows the piston body 19 at the extreme left hand end of the cylinder 11 of the feeder, in readiness for operation. The chambers 21 and 22 and all passages are filled with lubricant from the previous operation and, as previously stated, the piston when in the extreme position at either end of the cylinder, is in neutral position and the cam follower 18 will be at point a of the cam channel or groove, Figure 11. As shown most clearly in Figure 2, when the piston is in this neutral position, each of the pockets 23 and 24 of the piston is in communication with a port 13 while the discharge or outlet port 15, leading to the bearing, is closed.

The passage 26 always connects the pocket 23 with the lubricant chamber 21 and the opposite passage 27 always connects the pocket 24 of the piston with the lubricant chamber 22. The pocket 23 is always closed against communication with the chamber 22 and pocket 24 is always closed against communication with chamber 21.

The lubricant under pressure is now supplied through the port 13 leading into pocket 23 and fills this pocket and flows through the passage 26 into the chamber 21 to exert a force against the left hand end of the piston to cause it to move to the right.

At the same time that the lubricant under pressure enters the pocket 23, the opposite port 13 which is in communication with the pocket 24 is connected with the relief or exhaust side of the lubricant system which leads back to the source of supply and consequently chamber 22, through the passage 27 and pocket 24 is also in relief.

Figure 4:
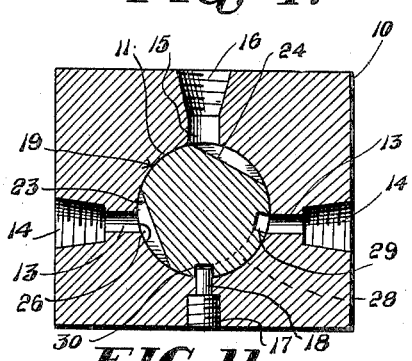
Figure 4 is a transverse section taken upon the line 4—4 of Figure 3.
Figure 5:
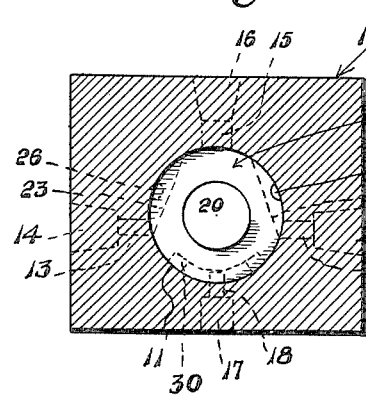
Figure 5 is a sectional view taken upon the line 5—5 of Figure 1.

As the lubricant continues to flow from the source of supply the piston 19 moves to the right. There is no rotation of the piston in the relative movement of the cam follower 18 from point $a$, Figure 11, of the cam channel, to point $b$ and lubricant displaced by the piston from the chamber 22 flows through the passage 27 and pocket 24 to the port 13 which is connected with the pocket 24 and back to the lubricant reservoir or source of supply. However, at point $b$ of the cam channel, the cam follower 13 contacts the inner side or periphery of the channel and since the follower is stationary, a continued movement of the piston 19 to the right causes the piston to rotate due to the pitch or angle of the wall of the short leg 32 which leads to the side 30 of the cam channel into which the follower has entered. The rotation of the piston from point $b$ to point $c$ is employed to move the pocket 24 out of connection or communication with the adjacent port 13 as is shown in Figure 4 and into communication with the discharge port 15 which leads to the bearing to be lubricated.

As will be readily understood, the lubricant displaced from the chamber 22 by the linear movement of the piston between points $b$ and $c$ is also discharged into the relief side of the system through that port 13 which connects with the pocket 24.

Figure 11:
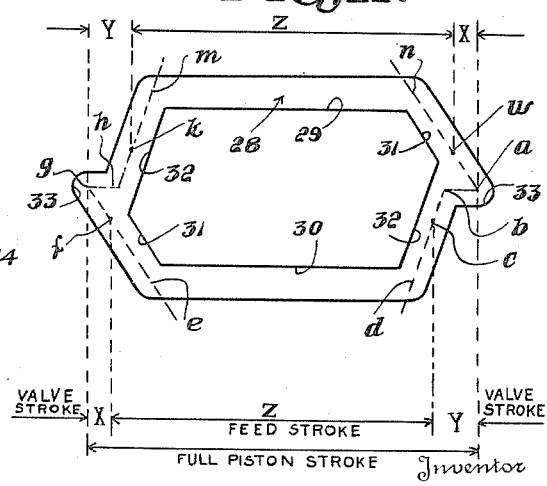
Figure 11 is a plan diagram of the cam track or groove which is formed in the side of the piston body, and as it would be seen if viewed through the piston looking down from the top of Figure 1.

The piston action, therefore, between the points $a$ and $c$ may be termed the valve stroke and the extent of this movement is designated $y$ in the cam diagram forming Figure 11.

As the piston continues to move to the right it also continues to revolve due to the cam action still being effective between points $c$ and $d$. However, since the relief port 13 has now been disconnected from the pocket 24 and the bearing port 15 has been connected with the pocket 24, the lubricant displaced from the chamber 22 passes through passage 27, pocket 24 and port 15, to the bearing. During this piston movement pocket 23 remains in communication with the port 13 through which the lubricant is being supplied under pressure, so that a continual force is being applied to the piston to maintain its movement to the right.

From point $d$ to point $e$ the piston continues to feed lubricant through bearing port 15.

When the cam follower 18 reaches point $e$ in the side 30 of the cam channel, cam action again takes place and the piston is revolved back toward its neutral position as will be readily apparent. However, between points $e$ and $f$, bearing feed is still maintained while the piston is disconnecting the lubricant containing pocket 24 from the port 15 and connecting it with the adjacent relief port 13.

From point $f$ to point $g$, only valve action takes place through the extent of the space marked $x$ and marked "valve stroke" and the displaced lubricant in chamber 22 is again moved out through the relief port 13 which is connected with pocket 24 and into the exhaust line.

Figure 6:
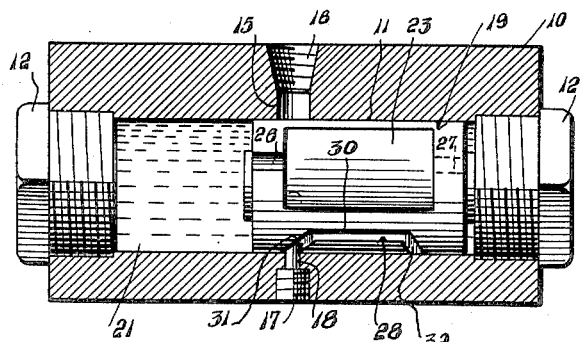
Figure 6 is a longitudinal section through the feeder corresponding to Figure 1 but showing the piston in neutral position in the opposite end of the piston chamber.
Figure 7:
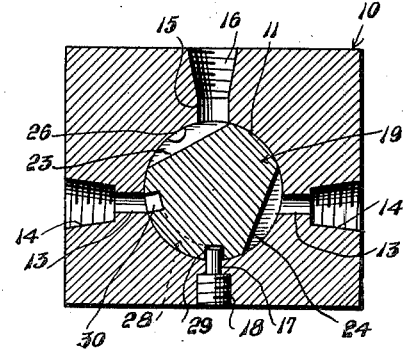
Figure 7 is a sectional view corresponding to Figure 4 but showing the position assumed by the piston when in the intermediate position shown in Figure 3 during its movement back from the position shown in Figure 6 to the position shown in Figure 1.

At point $g$ the piston has again assumed a neutral position to the extreme right of the feeder as shown in Figure 6 and is ready for the next operation which would be from right to left.

The next operation is similar to the one just described except that the lubricant pressure enters through the port 13 which leads into pocket 24 and the exhaust takes place at that port 13 which communicates with pocket 23. Thus the port 13 which previously received the pressure now becomes the exhaust or relief port and the other port 13 which previously was the exhaust or relief port now becomes the pressure receiving port. Also, the pocket 24 remains in connection with the adjacent port 13 and the pocket 23 connects with the outlet port 15 and establishes communication between this outlet port, the passage 26 and the chamber 21 from which latter chamber the lubricant is displaced. The position of the pocket 23 following the right to left movement of the piston, after the piston reaches the latter half of its rotation movement and during its lengthwise movement, is shown in the sectional view forming Figure 7.

The relative movement of cam follower and cam channel, when the piston moves from right to left is from point $g$ to points $h, k, m, n, w$ and $a$, to complete a cycle.

It will be noted that when the piston is on the feed stroke, during which time the cam follower is moving from point $c$ to point $f$, when the piston is moving from left to right and from point $k$ to point $w$ when the piston is moving from right to left, the cam channel or groove is in communication with the port 13 which is at that time functioning as the relief port. This feed stroke is designated $z$ in Figure 11. This feature of having the cam channel or groove in communication with the port under relief provides for the lubrication of the groove and follower.

Also in connection with the cam channel or groove, it is designed to give a relative motion with the cam follower of continuous travel around the cam groove in one direction only. This feature allows for the alternate connection of the ports as previously described.

It will be readily apparent from the foregoing that the action of the modified form of the feeder as shown in Figures 8 to 10 inclusive is exactly the same as in the first described forms.

It will also be apparent that the device of the present invention provides a simple and efficient means of feeding lubricant to a bearing without the use of springs, leathers, balls, checks or restricted passages and by the use of only a single moving part. The device can be made to serve one or two bearings, and it can be made in individual or multiple units and its simplicity makes for an inexpensive product which can be adapted to mass production methods.

I claim:

1. A lubricant feeder of the character stated, comprising a body having a piston cylinder therein, a pair of ports opening into the cylinder and a discharge port leading therefrom, a piston positioned in the cylinder for free reciprocatory movement and for turning movement, a pair of pockets carried by the piston and each having communication with the cylinder at one end only of the piston, said pockets each having communication with one of the pair of ports when the piston is in its extreme position in either end of the cylinder, the body of the piston between said pockets closing the discharge port when the piston is in either of such extreme positions, and means for effecting the partial turning of the piston simultaneously with its axial movement in either direction in the cylinder to effect closing of one of the pair of ports and the establishment of communication between a pocket and the discharge port.

2. A lubricant feeder of the character stated in claim 1, wherein the said means comprises an interconnected cam guide and follower between the body and the piston.

3. A lubricant feeder of the character stated in claim 1, wherein said means comprises an endless cam channel formed in the wall of the piston, and a follower carried by the body and engaging in said channel.

4. A lubricant feeder of the character stated, comprising a body having a piston cylinder therein, a pair of ports opening into the cylinder and a discharge port leading therefrom, a solid cylindrical piston positioned in the cylinder for free reciprocatory movement and for turning movement, a pair of recesses cut into the circular side face of the piston, said recesses constituting pockets and each having communication with one end only of the cylinder, said pocket forming recesses each being in communication with one of the pair of ports when the piston is in its extreme position in either end of the cylinder, the wall of this cylinder coacting with the recesses to form the complete pockets and the side of a piston between the recesses closing the discharge port when the piston is in either of the stated extreme positions, and a camming connection between the piston and the body which is constructed and arranged to effect a partial turning of the piston simultaneously with its axial movement in either direction in the cylinder to position a portion of the piston over one of the pair of ports to close the latter and to position a pocket forming recess in communication with the discharge port.

5. A lubricant feeder of the character stated in claim 4, in which the said camming connection is so constructed and arranged that the piston will be oscillated in one direction upon axial movement in one direction in the cylinder to establish communcation between a pocket forming recess and the outlet port and will be turned in the opposite direction upon axial movement in the other direction in the cylinder to establish communication between the outlet port and the other pocket forming recess.

6. A lubricant feeder as stated in claim 4, wherein the stated camming connection between the piston and the body comprises an endless cam channel formed in the side of the piston and a follower member carried by the body and engaging in said channel, said channel being positioned to be put in communication with one of the pair of ports when a pocket forming recess is in communication with the discharge port.

7. A lubricant feeder of the character stated, comprising a body having a circular passage formed therein, the passage being closed at each end to form a piston cylinder, a pair of ports formed in the body at opposite sides of the cylinder and in axial alignment, said ports being midway between the ends of the cylinder, a discharge port leading from the cylinder and positioned circumferentially thereof between the pair of ports, a piston body snugly fitted in the cylinder for axial movement and for turning movement therein, means at each end of the piston for limiting the axial movement of the piston in either direction in the cylinder providing a chamber between each end of the piston and the end of the cylinder when the piston is in either of its extreme positions in the cylinder, means forming a pair of pockets in the piston, each of said pockets having communication with one chamber only, said piston when in each of its extreme positions presenting a pocket for communciation with one of the pair of ports and having a portion between the pockets overlying and closing the discharge port, and a camming connection between the piston and the body which is so constructed and arranged as to impart a partial turning to the piston upon axial movement of the piston in either direction to effect the closing of one of the pair of ports by the piston and the establishment of communication between one of the pockets and a discharge port.

8. A lubricant feeder of the character stated in claim 7, in which said camming connection comprises an endless cam channel formed in the wall of the piston and a follower carried by the body and engaging in said channel, said camming connection effecting the turning of the piston in one direction upon movement of the piston to one end of the cylinder and the turning of the piston in the opposite direction upon movement of the piston to the opposite end of the cylinder whereby said pockets are alternately put into communication with the discharge port.

9. A lubricant feeder of the character stated, comprising a body having a piston cylinder therein, a pair of ports aligned transversely of the cylinder midway between the ends thereof and a discharge port leading from the cylinder and positioned circumferentially thereof between the pair of ports, a solid piston body snugly fitting in the cylinder for axial movement and for turning movement, means for stopping axial movement of the piston in either direction short of the end of the cylinder to provide a lubricant receiving chamber, the piston having two separate and independent cut-away areas in the sides thereof forming lubricant pockets, the outer sides of the cut-away areas being closed by the wall of the cylinder and the remote ends of the cut-away areas being in communication through the adjacent end of the piston with the adjacent chamber, said cut-away areas being so positioned that when the piston is at the extreme position of its movement in either end of the cylinder, each cut-away area will be in communication with one of the pair of ports and a portion of the piston between the cut-away areas will close the discharge port, a camming connection between the piston and the body which is so constructed and arranged that upon movement of the piston to one end of the cylinder one of the pair of ports will be closed and the adjacent cut-away area will be put into communication with the discharge port and upon movement of the piston to the opposite end of the cylinder the other one of the pair of ports will be closed and the adjacent cut-away area will be put into communication with the discharge port.

10. A lubricant feeder of the character stated in claim 9, in which the said camming means comprises a continuous cam channel formed in the side of the piston and having two spaced parallel relatively long side portions each merging at its ends in divergent leg portions, one of the leg portions of each side portion of the channel being of greater length than the other, the divergent leg portions of each of the side portions being positioned so that one short leg portion enters the inner side of a longer leg portion and the ends of the longer leg portions being in a line longitudinally of the piston and passing centrally between the said side portions of the channel to form seats, and a follower carried by the body and engaging in the cam channel, the follower being located in one of the said seats when the piston is at its extreme position in either end of the cylinder.

11. A feeder for lubricating bearings, comprising a cylinder, a pair of ports opening thereinto, an outlet port leading therefrom and positioned circumferentially thereof between the pair of ports, a single movable body in the cylinder designed to be moved therein from one end to the other and having a pair of pocket recesses in its side, and means for effecting a partial turning of the body during its movement in one direction from a position in which each pocket is in communication with one of the pair of ports and the outlet is closed by the body, to a position in which the outlet port is put into communication with one pocket and the one pocket is removed from communication with the adjacent one of the pair of ports and then back to the initial position, the pockets being always in communication with opposite ends of the cylinder and the other one of the pockets being continuously in communication with the other one of the pair of ports during the stated movement of the body in the one direction.

12. A feeder as set forth in claim 11, in which the said means is so constructed and arranged that upon reverse movement of the body, the body will be partly turned in the opposite direction to reverse the stated working connections between the pockets and the ports.

13. A combined fluid valve and feeder, comprising a cylinder, a pair of inlet ports opening thereinto midway between its ends, an outlet port in the plane transversely of the cylinder of the pair of ports, a single moving element in the cylinder in the form of a piston, a cam track and fixed follower engaging therein and coupling the piston and cylinder, the track having relatively long portions extending in parallel relation lengthwise of the cylinder and piston permitting reciprocatory movement of the piston and connected oblique terminal portions connecting the straight portions for effecting back and forth turning of the piston with its reciprocation in the cylinder, and means providing opposite fluid receiving spaces in the wall of the piston and communicating with opposite ends of the cylinder, said spaces and ports being so arranged so that one of the spaces is always in communication with the outlet port and the other space is in communication with one inlet port during the major part of the axial movement of the piston.

14. A feed for lubricating bearings, comprising a cylinder, a pair of ports leading thereinto, outlet means leading therefrom, a single piston movable in the cylinder and having two non-communicating lubricant carrying pockets having communication with opposite ends of the cylinder, mechanical means cooperating between the piston and the cylinder to effect a turning of the piston simultaneously with its axial movement in either direction in the cylinder, said turning movement effecting a valving action to establish communication between one pocket and one of the pair of ports and between the other pocket and said outlet means, and said axial movement of the piston effecting ejection of the lubricant from one end of the cylinder through said other outlet pocket to the outlet means.

RAYMOND G. BROWNSTEIN.

REFERENCES CITED

The following references are of record in the file of this patent:

UNITED STATES PATENTS

| Number | Name | Date |
|---|---|---|
| 1,870,068 | Roberts | Aug. 2, 1932 |
| 1,951,771 | Reswick | Mar. 20, 1934 |
| 1,977,233 | Hallerberg | Oct. 16, 1934 |
| 2,126,451 | Greveling | Aug. 9, 1938 |
| 2,331,924 | Nemetz | Oct. 19, 1943 |
| 2,369,428 | Berg | Feb. 13, 1945 |